Nov. 24, 1953 — J. R. BECKHAM — 2,659,981
SCRIBING GAUGE
Filed Aug. 13, 1951
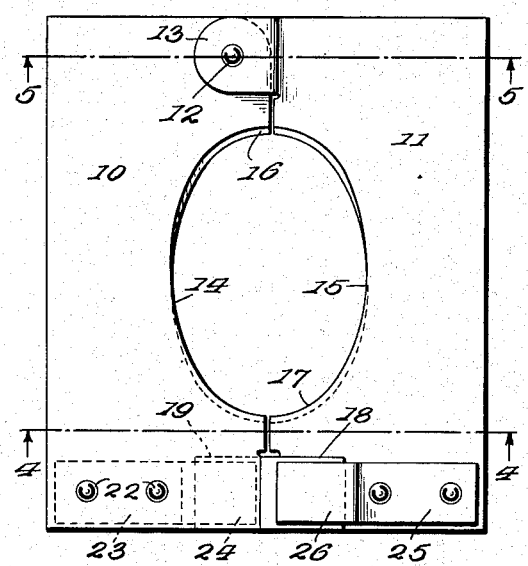
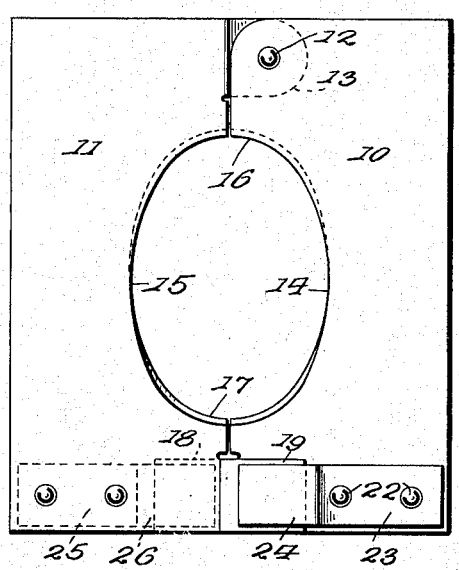
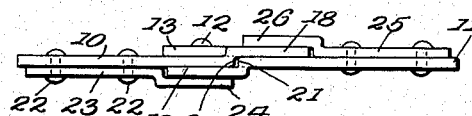
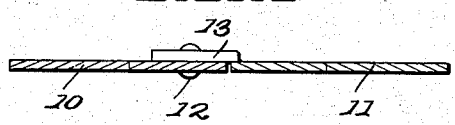
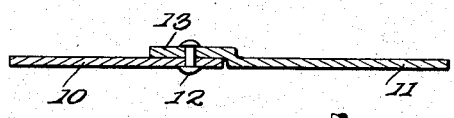
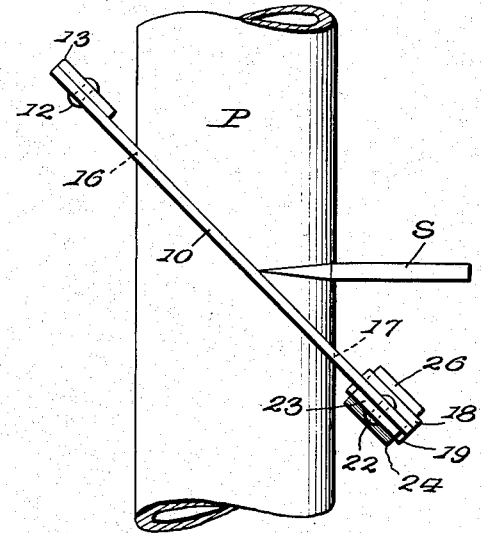
INVENTOR
Jefferson R. Beckham
BY Bryant & Lowry
ATTORNEYS

Patented Nov. 24, 1953

2,659,981

UNITED STATES PATENT OFFICE 2,659,981

SCRIBING GAUGE

Jefferson R. Beckham, Atlanta, Ga.

Application August 13, 1951, Serial No. 241,587

4 Claims. (Cl. 33—174)

This invention relates to scribing gauges and particularly to gauges used in scribing a guide line for cutting a straight pipe or tube at a given angle.

In the construction of fluid conduit or plumbing systems it has been found desirable to eliminate costly threaded fittings and joints and to make use of the more economical soldered or welded joints. For example, in the use of copper piping for residential home plumbing systems, changes of direction are accomplished by mitered and soldered joints. In the heavy industrial installations where large diameter iron or steel piping is used, cumbersome fittings are replaced by welded joints or bends.

The miter cuts for a given change of direction are for the most part made right on the job, and by the use of a hand saw or cutting torch. Further, the cut must very often be made on the free end of a pipe which is already partially installed and has its opposite end fixed to the system. In such a mitered joint the angle for each pipe cut must be accurately chosen, since the angle of cut on each of the pipe ends to be joined must be exactly one half of the total change in direction in degrees. Further, an accurate, continuous and clear scribed line must be available to the mechanic so that the cut at the chosen angle will be true and provide accurate mating of the cut pipe edges.

It is an object of the present invention to provide a scribing gauge that is light, portable and sturdy enough to retain its accuracy under rough, on-the-job usage.

Another object of the invention is to provide a simple, pipe scribing gauge that may be economically furnished in calibrated sets for a given pipe size and for any given series of mitering angles.

Still another object of the invention is to provide a gauge which may be used by any mechanic or workman of minimum skill, and which may be used to mark a pipe which may be already partially installed in a difficult or close working position.

A further object of the invention is to provide a gauge which may be opened to permit it to encircle a pipe whereby said gauge may be instantly applied at any desired point on a pipe without the necessity of threading it over the end thereof.

Still another object of the invention is to provide a gauge which may simply and easily be opened for the purpose described, while at the same time when closed and in place retaining the stiffness and resistance to twist and distortion necessary for accuracy.

A further object of the invention is to provide a gauge which supplies a continuous guide edge for the scriber on the work surface and in which correction is made for the thickness of metal used in making the gauge.

With the above and other objects in view, as will be presently apparent, the invention consists in general of certain novel details of construction and combinations of parts hereinafter fully described, illustrated in the accompanying drawings, and particularly claimed.

In the accompanying drawings, like characters of reference indicate like parts in the several views, and:

Fig. 1 is a plan view of one planar face of the gauge, with the hinged plate sections in closed position.

Fig. 2 is a plan view of the opposite planar face of the gauge from that of Fig. 1.

Fig. 3 is an end view of the gauge from the latching end showing the means for holding the plate sections in closed position.

Fig. 4 is a sectional view taken on the line 4—4 of Fig. 1.

Fig. 5 is a sectional view taken on the line 5—5 of Fig. 1.

Fig. 6 is a side elevational view showing the device in use for scribing a cutting guide line on a section of pipe.

Fig. 7 is a view showing a simplified modification of the gauge in place for scribing a pipe, and wherein the gauge consists of a unitary plate having an elliptical aperture therein.

The preferred form of gauge shown is formed of the two plate sections 10 and 11 pivotally connected by the hinge pin 12. In order that the plates 10 and 11 may be in planar alignment and thus provide a scribing edge which is in one plane, the plate 11 has formed in one corner an offset ear 13, and, as shown in Fig. 5, the hinge pin 12 passes through this ear to hingedly connect the plate 11 to the plate 10.

Each of the plates 10 and 11 has cut on its inner side edge the semi-elliptical notches 14 and 15 respectively, and which notches, when the plates are closed, form an elliptical opening. The size of this elliptical opening is gauged to correspond to the cross-sectional dimension of a given sized pipe at a given angle. A complete set of gauges would thus be furnished to cover the various stock sizes of pipe and various angles normally used in pipe work.

In case the gauge shown herein is formed of relatively thick stock, correction is made for such thickness by beveling the lip or side edge of the elliptical opening. This bevel would be formed by a tool held at a constant angle and direction relative to the plane of the gauge. As shown in Figs. 1 and 2 the angle of bevel would vary from a maximum at the major axis on the end 16 of the ellipse to a minimum at the end of the minor axis, and then to a maximum again on the end 17 of the ellipse. When taken from the viewpoint of Fig. 1 the end 17 would appear undercut and the end 16 overcut. Thus, when the gauge is placed upon a pipe and tilted, the beveled lip will conform snugly to the pipe surface and a continuous scribing guide edge will be provided. The angle of the bevel at the maximum point is governed by the particular angle of cut for which the particular gauge is designed.

The means for fastening the plate sections 10 and 11 in closed relationship are shown in Figs. 1 through 3. The plate 10 has projecting from the corner opposite the hinge corner the ear 18 which is offset from the plane of the plate 10 by an amount equal to the thickness of the plate. On the corresponding corner of the plate 11 and offset in the opposite direction is the ear 19. Thus, when the plates are moved together until the shoulders 20 and 21 formed by the offset ears meet, and each ear overlaps the opposite plate section, the plate sections 10 and 11 will be in exact planar alignment.

Adjacent the outer end edge of the plate 10 and on one face thereof is fastened by any means such as by the rivets 22 the resilient clip 23. This clip has an offset end 24 which together with the plate 10 forms a pocket which receives and grips the ear 19 of the plate 11.

A similar resilient clip 25 is placed on the opposite face of the plate 11 and is provided with an off-set end 26 which cooperates with the plate 11 to form a pocket which grips the ear 18 of the plate 10.

Thus each of the ears 18 and 19 is securely gripped in a resilient pocket. It will be evident that a single ear and resilient clip could be employed for holding the gauge closed, but the double gripping action is to be preferred in that the plates are held more securely with greater resistance to twist and distortion which would destroy the accuracy of the gauge.

The use of the gauge is clearly shown in Fig. 6. The plate sections are opened about the hinge pin 12 and are then closed about the pipe section P where the cut is to be made. When the resilient clips 23 and 25 have gripped the ears 19 and 18 respectively, the gauge is tilted until the lip of the elliptical opening engages the pipe in snug relationship. The scriber S is then moved around the lip of the elliptical opening to mark the cut.

While there is herein shown and described the preferred form of the invention, it is to be understood that minor changes may be made therein without departing from the spirit and scope of the invention as claimed. As shown in Fig. 7, the gauge may be made of a unitary, planar plate 27 with an elliptical opening formed therein. In this form, the device may be slipped over the end of a pipe, moved longitudinally thereof to the point where the cut is desired, and then tilted to make the proper guide for the scribing mark.

What is claimed is:

1. A gauge for scribing a guide line for a predetermined fixed angle cut on a cylindrical pipe, including a pair of flat plate sections side by side in planar alignment and pivotally connected at one pair of adjacent corners to open about an axis perpendicular to the plane of said sections, said plates having semi-elliptical notches formed in their adjacent side edges cooperative when said sections are closed to provide a true elliptical opening in said gauge, said elliptical opening having a minor axis substantially equal in length to the diameter of said pipe, whereby said gauge may be closed about said pipe and tilted to form a guide for a scriber in marking for said predetermined fixed angle cut on said pipe, said gauge when in fully tilted position for scribing closely engaging the outer cylindrical surface of the pipe at all points around the ellipse defined by the gauge plate sections.

2. A gauge for scribing a guide line for a predetermined fixed angle cut on a cylindrical pipe, including a pair of flat plate sections side by side in planar alignment and pivotally connected at one pair of adjacent corners to open about an axis perpendicular to the plane of said sections, said plates having semi-elliptical notches formed in the adjacent side edges cooperative when said sections are closed to provide an elliptical opening in said gauge, said elliptical opening having a minor axis substantially equal in length to the diameter of said pipe, whereby said gauge may be closed about said pipe and tilted to form a guide for a scriber in marking for said predetermined fixed angle cut on said pipe, said gauge when in fully tilted position for scribing closely engaging the surface of the pipe at all points around the ellipse defined by the gauge plate sections, each of said remaining pair of adjacent corners having an off-set ear parallel to the gauge surface and overlying the adjacent plate section, and resilient clips on said plate sections placed to grip said ears when the gauge sections are in closed position.

3. A scribing gauge as set forth in claim 1 wherein the side edge of the plate sections at the elliptical opening is bevelled at an angle to the plane of the gauge to thereby compensate for the thickness of the gauge metal, the angle of said bevel following the contour of the pipe when the gauge is tilted into scribing position.

4. A gauge for scribing a guide line for a predetermined fixed angle cut on a cylindrical pipe, including a pair of flat plate sections side by side in planar alignment and pivotally connected at one pair of adjacent corners to open about an axis perpendicular to the plane of said sections, said pivotal connection comprising an off-set ear on one section parallel to and overlying the adjacent section with a hinge pin passed therethrough, said plates having semi-elliptical notches formed in the adjacent side edges cooperative when said sections are closed to provide an elliptical opening in said gauge, said elliptical opening having a minor axis substantially equal in length to the diameter of said pipe, whereby said gauge may be closed about said pipe and tilted to form a guide for a scriber in marking for said predetermined fixed angle cut on said pipe, said gauge when in fully tilted position for scribing closely engaging the surface of the pipe at all points around the ellipse defined by the gauge plate sections, each of said remaining pair of adjacent corners having an offset ear parallel to the gauge surface and overlying the adjacent plate section, said ears further being on opposite faces of said gauge, and clips secured to said flat plate sections and having free, resilient ends spaced from said plate section surface and placed to overlie said ears when the plate sections are closed whereby said ears will be gripped between said resilient ends and said plate section surfaces to hold said gauge in closed position.

JEFFERSON R. BECKHAM.

References Cited in the file of this patent

UNITED STATES PATENTS

| Number | Name | Date |
|---|---|---|
| 391,113 | Brierly et al. | Oct. 16, 1888 |
| 440,475 | Hall | Nov. 11, 1890 |
| 1,212,824 | Sessions | Jan. 16, 1917 |
| 1,568,876 | Campbell | Jan. 5, 1926 |
| 1,683,953 | Carr | Sept. 11, 1928 |
| 2,326,447 | Enderson | Aug. 10, 1943 |
| 2,337,957 | Akins | Dec. 28, 1943 |